United States Patent [19]

Kiang

[11] Patent Number: 4,643,945
[45] Date of Patent: Feb. 17, 1987

[54] HEAT SEALABLE BLEND OF POLYPROPYLENE TERPOLYMERS AND LINEAR LOW DENSITY POLYETHYLENE

[75] Inventor: Webster W. Kiang, Lisle, Ill.

[73] Assignee: Enron Chemical Company, Rolling Meadows, Ill.

[21] Appl. No.: 771,702

[22] Filed: Sep. 3, 1985

[51] Int. Cl.$^4$ ............................................. B32B 9/00
[52] U.S. Cl. ..................................... 428/349; 428/35; 428/347; 428/516; 525/240
[58] Field of Search ............... 428/349, 516, 35, 347; 525/240

[56] References Cited

U.S. PATENT DOCUMENTS

| 4,161,574 | 7/1979 | Strametz et al. | 526/159 |
|---|---|---|---|
| 4,256,784 | 3/1981 | Gebhardt et al. | 428/216 |
| 4,291,092 | 9/1981 | Weiner | 428/349 |
| 4,297,411 | 10/1981 | Weiner | 428/347 |
| 4,303,708 | 12/1981 | Gebhardt et al. | 428/35 |
| 4,316,978 | 2/1982 | Hughes | 525/240 |
| 4,339,496 | 7/1982 | Weiner | 428/349 |
| 4,339,497 | 7/1982 | Weiner | 428/349 |
| 4,339,498 | 7/1982 | Weiner | 428/349 |
| 4,340,641 | 7/1982 | Weiner | 428/349 |
| 4,415,718 | 11/1983 | Miyoshi et al. | 526/348.6 |

Primary Examiner—Edith Buffalow
Attorney, Agent, or Firm—Donald F. Haas

[57] ABSTRACT

A polymer blend which is useful for forming heat sealable plastic film which comprises from about 60% to about 40% by weight of a polypropylene terpolymer comprising about 0.1 to about 10.0 mole percent ethylene, about 0.1 to 10.0 mole percent 1-butene, and the balance propylene, and 40% to 60% of a copolymer of ethylene and alpha olefins containing four or more carbon atoms wherein the ethylene content has from about 90.0 to about 99.9 mole percent.

5 Claims, No Drawings
}

HEAT SEALABLE BLEND OF POLYPROPYLENE TERPOLYMERS AND LINEAR LOW DENSITY POLYETHYLENE

BACKGROUND OF THE INVENTION

This invention relates to heat sealable blends of polypropylene terpolymers containing ethylene and 1-butene with copolymers of ethylene and alpha olefins containing four or more carbon atoms. Such blends may be used to form film which is characterized by lower heat seal initiation temperatures than films known in the past.

A wide variety of plastic films are used in packaging applications such as bags, pouches, tubs and trays. In many of these applications, it is important that the plastic film be readily heat sealable as well as possessing other good physical and mechanical properties such as resistance to tearing, tensile strength, and processability in high speed equipment.

Many plastic materials which are used in the formation of film products do not themselves exhibit good heat sealing characteristics. Polypropylene, for instance, is not readily heat sealable at the relatively low temperatures which are preferred for use in commercial film making applications. As a result, there has been quite a bit of development work to find plastic materials which are readily heat sealable and which can be used compatibly with stronger substrate materials to form multilayer films.

It has been discovered that polypropylene polymers such as terpolymers of primarily propylene units with smaller amounts of ethylene units and units of an alpha olefin having four or more carbon atoms exhibit excellent heat sealing characteristics. U.S. Pat. Nos. 4,256,774, 4,275,119, 4,303,708, 4,339,497 and 4,339,498 disclose the use of such terpolymers and other terpolymers in the manufacture of heat sealable packaging films. Blends of different polymers have been used to create good heat sealing films. U.S. Pat. Nos. 4,291,092, 4,297,411, 4,339,496 and 4,340,641 all disclose heat sealable films made from a blend of a copolymer of ethylene and a higher olefin and a copolymer of propylene and an olefin such as ethylene or one that has four or more carbon atoms. Also, U.S. Pat. No. 4,316,970 discloses a film made from a heat sealable blend of a butene-1-ethylene copolymer and about 2-9% by weight of polypropylene. This blend is said to form film exhibiting improved heat sealing characteristics.

One of the most important characteristics for a heat sealable film is the temperature at which the sealing begins, i.e. the heat seal initiation temperature. This is important because it is desired to operate at as low a temperature as possible because (1) it broadens the heat-sealable range, and (2) it permits higher productivity due to less time for cooling. I define the heat seal initiation temperature as that temperature when the strength of the heat seal exceeds 0.5 pounds per inch because this criterion satisfies most of the applications.

The terpolymers and blends described above all exhibit very good heat sealing characteristics. However, I have found that my blend achieves a lower heat seal initiation temperature than the terpolymers alone.

SUMMARY OF THE INVENTION

My invention is directed to a polymer blend which is useful for forming heat sealable plastic film. My blend comprises from about 40% to about 60% by weight of copolymers of ethylene and alpha olefins containing four or more carbon atoms wherein the ethylene content is about 90.0 to about 99.9 mole percent, and the balance comprising a polypropylene terpolymer comprising about 0.1 to about 10.0 mole percent ethylene, about 0.1 to about 10.0 mole percent 1-butene, and the balance propylene. This blend can be formed into a single layer film or sheet or used in a multiple layer heat sealable film which includes a substrate layer and at least one heat sealable layer made from the blend described above.

DETAILED DESCRIPTION OF THE INVENTION

The copolymers of ethylene and alpha olefins containing four or more carbon atoms used in the present invention are available commercially and their method of manufacture is well known. Such copolymers are otherwise known as linear low density polyethylene and the alpha olefin component is generally 1-butene, 1-hexene, or 1-octene. Such copolymers generally contain about 90.0 to about 99.9 percent ethylene. If the concentration of the ethylene copolymer is less than about 40%, then there is insufficient decrease in the heat seal initiation temperature. If concentration is more than 60 weight percent, then the heat seal initiation temperature is lowered but the film composition has undesirable hot tack properties. Hot tack is a measure of melt strength at an elevated temperature or sealing temperature.

The polypropylene terpolymers used in the blend of the present invention generally contain from about 0.1 to about 10.0 mole percent ethylene and from about 0.1 to about 10.0 mole percent 1-butene. These mole percentage ranges are chosen because of ease of processing and film fabrication. The terpolymers may be prepared in the same polymerization facilities which are used to prepare isotactic propylene homopolymers. Conventionally highly stereospecific catalyst systems may also be used for the preparation of the terpolymers. Such catalyst systems include aluminum alkyls such as aluminum triethyl and diethyl aluminum chloride as the activator and a titanium trichloride-containing component which may be combined with aluminum trichloride. Such processes and catalyst systems are well known in the art. The concentrations of the catalyst and the operating conditions are the same as normally used for homopolymerization of propylene with the same catalysts. The comonomers are merely introduced into the reactor in the same manner as comonomers are introduced when making copolymers of propylene and other olefins.

The blend of the present invention is used to manufacture film in any conventional manner. For example, the blend may be cast into film with a flat die or blown into film with a tubular die. The film made with the blend of the present invention may be incorporated into a multilayer film as the heat sealing surface layer. The heat sealable layer may be extruded onto one or both surfaces of a prefabricated base layer of film or it may be extruded as a self-supporting film which is then laminated to one or both surfaces of the base layer or film. The base layer or film may be unoriented, uniaxially oriented or biaxially oriented polypropylene, as well as polyethylene, polyamide, polyester, etc.

The film products made with the blend of the present invention are useful in a wide variety of application in which heat sealability is important. Such applications include horizontal form, fill and seal, vertical form, fill and seal and pouches, etc.

EXAMPLE

Various blends of a copolymer of ethylene and 1-butene (3.5 mole percent 1-butene) and a polypropylene terpolymer (6.0 mole percent ethylene and 1.0 mole percent 1-butene) were prepared by dry blending and then fed into a one and one-quarter inch Killion extruder to produce blown film. The die of the extruder was two inches in diameter and a blow-up-ratio of 1.6:1 was used.

The various films were then tested to determine their heat sealing properties. This testing was carried out on a five station low pressure sealer. The testing conditions were 1.0 seconds dwell, less than 1.0 psi pressure, and 1 mil. milar release film. The heat seal initiation temperature was determined by measuring the seal strength at a particular temperature and then increasing the temperature at 5° C. intervals. When the heat seal strenghth exceeded 0.5 pounds per inch, the experiment was stopped and that temperature was selected as the heat seal initiation temperature.

The results of these tests are shown in the Table below:

TABLE

| Weight Percent Terpolymer/Weight Percent Ethylene Copolymer | Heat Seal Initiation Temperature |
| --- | --- |
| 100/0 | 120° C. |
| 60/40 | 115° C. |
| 50/50 | 115° C. |
| 40/60 | 115° C. |
| 0/100 | 105° C. |

It can be seen that the blending of the two components of the present invention decreases the heat seal initiation temperature within the claimed ratio of terpolymer to ethylene copolymer.

I claim:
1. A polymer blend useful for forming heat sealable plastic film, which comprises:
    (a) from about 60% to about 40% by weight of a first component selected from a group consisting of polypropylene terpolymers of ethylene, 1-butene, and propylene wherein the ethylene content is from about 0.1 to about 10.0 mole percent and the 1-butene content is from about 0.1 to about 10.0 mole precent, and
    (b) from about 40% to about 60% by weight of the total blend of a second component selected from the group consisting of copolymers of ethylene and alpha olefins containing four or more carbon atoms wherein the ethylene content of the copolymer is from about 90.0 to about 99.9 mole percent.
2. A film or a sheet comprising:
    (a) from about 60% to about 40% by weight of a first component selected from a group consisting of polypropylene terpolymers of ethylene, 1-butene, and propylene wherein the ethylene content is from about 0.1 to about 10.0 mole percent and the 1-butene content is from about 0.1 to about 10.0 mole percent, and
    (b) from about 40% to about 60% by weight of the total blend of a second component selected from the group consisting of copolymers of ethylene and alpha olefins containing four or more carbon atoms wherein the ethylene content of the copolymer is from about 90.0 to about 99.9 mole precent.
3. A multiple layer heat sealable film comprising a base layer and at least one heat sealable layer comprising:
    (a) from about 60% to about 40% by weight of a first component selected from a group consisting of polypropylene terpolymers of ethylene, 1-butene, and propylene wherein the ethylene content is from about 0.1 to about 10.0 mole precent and the 1-butene content is from about 0.1 to about 10.0 mole percent, and
    (b) from about 40% to about 60% by weight of the total blend of a second component selected from the group consisting of copolymers of ethylene alpha olefins containing four or more carbon atoms wherein the ethylene content of the copolymer is from about 90.0 to about 99.9 mole percent.
4. The film of claim 3 wherein the base layer is polypropylene.
5. The film of claim 4 wherein the base layer is oriented in at least one direction.

* * * * *